US012565917B2

(12) United States Patent
Welp

(10) Patent No.: US 12,565,917 B2
(45) Date of Patent: Mar. 3, 2026

(54) FRICTION LININGS FOR ALUMINUM BRAKE DISKS

(71) Applicant: TMD Friction Services GmbH, Leverkusen (DE)

(72) Inventor: Dirk Welp, Essen (DE)

(73) Assignee: TMD Friction Services GmbH, Leverkusen (DE)

( * ) Notice: Subject to any disclaimer, the term of this patent is extended or adjusted under 35 U.S.C. 154(b) by 451 days.

(21) Appl. No.: 17/618,437

(22) PCT Filed: Jun. 27, 2019

(86) PCT No.: PCT/EP2019/067261
§ 371 (c)(1),
(2) Date: Dec. 11, 2021

(87) PCT Pub. No.: WO2020/259844
PCT Pub. Date: Dec. 30, 2020

(65) Prior Publication Data
US 2022/0205501 A1 Jun. 30, 2022

(51) Int. Cl.
| | |
|---|---|
| *F16D 69/00* | (2006.01) |
| *C22C 21/00* | (2006.01) |
| *C22C 21/06* | (2006.01) |
| *F16D 65/12* | (2006.01) |
| *F16D 69/02* | (2006.01) |

(52) U.S. Cl.
CPC ............ *F16D 65/127* (2013.01); *C22C 21/00* (2013.01); *C22C 21/06* (2013.01); *F16D 65/125* (2013.01); *F16D 69/027* (2013.01); *F16D 2200/003* (2013.01)

(58) Field of Classification Search
CPC .... F16D 65/127; F16D 65/125; F16D 69/027; F16D 2200/003; C22C 21/00; C22C 21/06
See application file for complete search history.

(56) References Cited

U.S. PATENT DOCUMENTS

| | | | | |
|---|---|---|---|---|
| 5,407,035 | A | * | 4/1995 | Cole ..................... F16D 65/127 |
| | | | | 188/218 XL |
| 5,535,857 | A | * | 7/1996 | Barlow .................. B22D 19/14 |
| | | | | 188/218 XL |
| 5,793,293 | A | | 8/1998 | Melamud et al. |
| 5,856,278 | A | | 1/1999 | Brewer |
| 5,957,251 | A | | 9/1999 | Jones et al. |
| 6,481,555 | B1 | | 11/2002 | Hell |
| 8,962,148 | B2 | * | 2/2015 | Xia ......................... B22D 19/00 |
| | | | | 188/218 XL |
| 9,404,546 | B2 | | 8/2016 | Cox |
| 9,879,740 | B2 | * | 1/2018 | Tironi ................... F16D 65/127 |
| 11,879,513 | B2 | * | 1/2024 | Kesavan ............... F16D 69/025 |
| 2001/0003321 | A1 | * | 6/2001 | Sano ..................... F16D 69/026 |
| | | | | 188/218 XL |
| 2004/0175544 | A1 | * | 9/2004 | Saikatsu ............... F16D 69/026 |
| | | | | 428/143 |
| 2004/0237713 | A1 | * | 12/2004 | Breslin ............... C04B 41/5031 |
| | | | | 75/235 |
| 2009/0078515 | A1 | * | 3/2009 | Xia ......................... B22D 19/02 |
| | | | | 188/218 XL |
| 2012/0058363 | A1 | | 3/2012 | Verpoort |
| 2013/0302643 | A1 | * | 11/2013 | Grun .................... B23K 35/288 |
| | | | | 75/684 |
| 2015/0354647 | A1 | * | 12/2015 | Tironi ................... F16D 65/125 |
| | | | | 427/451 |
| 2015/0369320 | A1 | * | 12/2015 | Onda ........................ C08K 3/04 |
| | | | | 523/156 |
| 2016/0230827 | A1 | * | 8/2016 | Kaji ........................ F16D 69/026 |
| 2016/0348744 | A1 | * | 12/2016 | Broda ...................... C23D 5/02 |
| 2017/0204920 | A1 | * | 7/2017 | Poirier ................... C23C 24/00 |
| 2018/0306260 | A1 | * | 10/2018 | Moore ................. B28B 11/243 |
| 2020/0032869 | A1 | * | 1/2020 | Kaji ..................... F16D 69/026 |

FOREIGN PATENT DOCUMENTS

| | | | |
|---|---|---|---|
| CN | 104265816 | A | 1/2015 |
| CN | 106812837 | A | 6/2017 |
| DE | 69403791 | T2 | 10/1997 |
| DE | 19828301 | A1 | 2/2000 |
| DE | 69513634 | T2 | 7/2000 |
| JP | H06228540 | A | 8/1995 |
| JP | 2001524167 | A | 11/2001 |
| JP | 2007314598 | A * | 12/2007 |
| KR | 20010091694 | A | 10/2001 |
| WO | 9415112 | A1 | 7/1994 |
| WO | 1998050712 | A | 11/1998 |
| WO | 2015193361 | A1 | 12/2015 |

OTHER PUBLICATIONS

Machine translation of JP2007314598, retrieved Jan. 27, 2024 (Year: 2024).*

* cited by examiner

*Primary Examiner* — Bradley T King

(74) *Attorney, Agent, or Firm* — Rogowski Law LLC

(57) ABSTRACT

Friction linings which contain more than 5 wt. % aluminum in the form of Al metal (powder) or of an Al alloy are suitable to ensure sufficiently high friction coefficients at little wear when combined with aluminum-containing brake disks or rotors.

5 Claims, No Drawings

FRICTION LININGS FOR ALUMINUM BRAKE DISKS

CROSS-REFERENCE TO RELATED APPLICATIONS

This application is a national stage application (under 35 USC § 371) of PCT/EP2019/067261, filed Jun. 27, 20190, the contents of which are incorporated by reference herein.

BACKGROUND OF THE INVENTION

Technical Field and State of the Art

The present invention relates to friction linings and to corresponding friction lining mixtures that are especially well-suited for use in disk brakes with aluminum brake disks or aluminum rotors. In particular, the invention relates to the use of friction linings containing aluminum in combination with brake disks or rotors containing aluminum.

Within the scope of the greatly increased introduction of motor vehicles, particularly passenger cars, that make use of recuperation techniques, the automotive industry is once again turning to the idea of employing aluminum as a material for or as a component of brake disks. Since the thermal stress of the brake disks in the above-mentioned vehicles no longer reaches the values encountered with conventional drives, the use of aluminum in brake disks accounts for more than just weight advantages.

The state of the art describes various friction lining formulations which are considered to be suitable for use in combination with aluminum brake disks.

For instance, German DE 694 03 791 T2 (translation of published international application) describes a friction lining composition for a rotor made of an aluminum and metal matrix composite (Al-MMC) that is intended to prevent degradation of the rotor during braking. In this context, the aim is also to establish an average coefficient of friction of 0.38 to 0.42. This friction lining mixture contains 2% to 12% by weight of porous copper powder for purposes of reducing the wear and tear between the aluminum rotor and the friction lining.

German translation of published international application DE 695 13 634 T2 describes a friction lining mixture for the same area of application which has to contain 5% to 80% by volume of a finely dispersed aluminum oxide having a specific particle size.

PCT international application WO 94/15112 relates to a brake lining for disk brakes having aluminum brake disks whose composition is to be determined in such a way that the friction value remains consistently high up to a temperature of 400° C. and markedly drops in the range up to 450° C.

Friction linings containing aluminum are known in the state of the art.

PCT International Application WO 2015/193361 A1 discloses a friction material that is free of copper and that contains 5% to 9.75% by weight of fibers of an Al—Mg alloy such as, for instance, AlMg$_5$.

German patent application DE 198 28 301 A1 relates to a friction lining that contains up to 0.5% to 15% by weight of an Al—Zn alloy, for example, AlZn$_5$, and therefore has corrosion-protection properties.

Friction linings that can contain more than 90% by weight of aluminum metal (powder) and/or aluminum alloys are described in Korean patent document KR 10 2001 009 1694.

Finally, Chinese patent document CN 104265816 discloses a friction lining containing 20% to 30% by weight of an aluminum alloy and silicon carbide (SiC). In this context, the aluminum alloy serves as a substitute for steel fibers in the friction lining mixture and it brings about improved properties in terms of the friction, the wear and tear as well as the temperature.

In summary, it can be said that the state of the art usually proposes friction linings containing copper for use in conjunction with aluminum brake disks or aluminum rotors. However, copper is classified as a heavy metal by various environmental authorities and consequently is not classified as being environmentally friendly, as a result of which a trend can be observed towards brake linings or friction linings that are free of copper. However, friction linings free of copper on aluminum disks generally have a very low friction value of approximately 0.3.

The described friction linings containing aluminum are meant for use in combination with conventional brake disks (cast iron, steel), whereby the use of aluminum or aluminum alloys, for example, is intended to replace steel fibers in such linings or to effectuate an improvement of the corrosion-protection properties of these linings.

Finally, it is generally known in the state of the art that friction linings that are used with cast-iron rotors cannot be employed for aluminum-based rotors since the abrasive materials of such friction linings scratch an aluminum-based rotor and ultimately, a stable coefficient of friction cannot be achieved in this manner.

SUMMARY OF THE INVENTION

Before this backdrop, an objective of the present invention was to put forward friction linings or friction lining formulations which, in combination with brake disks or rotors containing aluminum, ensure a sufficiently high friction value and, at the same time, do not exhibit the disadvantages of the friction linings from the state of the art at all or else only to a greatly reduced extent when it comes to the friction, the wear and tear as well as the temperature properties.

As set forth in the present invention, the term "brake disks or rotors containing aluminum" generally refers to those brake disks or rotors that contain or are made of aluminum in the form of metal or in the form of aluminum alloys. Novel materials for brake disks or rotors are the so-called aluminum-metal matrix composites (Al-MMC) which constitute a type of aluminum alloy with reinforcement in the form of either particles or fibers. These reinforcements or components greatly increase the strength and hardness of an aluminum base alloy. In this context, preference is given to using SiC (10% to 90% by volume) as the reinforcement material, although aluminum oxide and other ceramic materials can likewise be employed.

The concentration of aluminum in brake disks of the state of the art, in the form in which they can also be used in the present invention, is generally 20% to 60% by volume (with aluminum as the metal), especially approximately 40% by volume.

One objective according to the invention is achieved by the use of aluminum and/or its so-called compounds, which are especially aluminum alloys, in the production of friction linings. In this context, aluminum as the metal (e.g. in the form of an unalloyed metal powder) is preferably used as the friction lining component. When it comes to the aluminum alloys, preference is given to low alloyed aluminum alloys. Here, wear-resistant aluminum alloys can have a positive impact on the friction behavior of the friction linings configured in this manner. This especially holds true for alloys having a high temperature resistance.

In this context, a concentration of at least 5% to 30% by weight is preferred, although higher aluminum concentrations are also possible. Here, the values in percentage by weight refer to the portion of aluminum (expressed in the form of a metal, with the aluminum alloys being commensurately converted to the aluminum content) contained in the finished friction lining mixture, on the basis of which the friction lining is then produced by means of methods known in the state of the art. Preferred concentrations of aluminum in the friction linings are 5% to 25% by weight, especially 10% to 20% by weight.

The preferred friction linings according to the invention contain aluminum in the form of metallic aluminum (unalloyed), especially in powder form, and/or in the form of aluminum alloys.

Aluminum alloys containing magnesium (Mg) or titanium (Ti) have proven to be particularly well-suited for achieving the above-mentioned objective. Other alloy constituents such as, for example, silicon (Si), are likewise fundamentally suitable. In this context, they can be binary, ternary or quaternary alloy systems, among which preference is given to the binary aluminum alloys. These binary systems of the type $Al_xZ_y$ (wherein Z preferably stands for Mg or Ti and x=10% to 90% by weight and y=10% to 90% by weight) have proven to be highly suitable. In particular, alloys such as $AlTi_{10}$ and $AlMg_{50}$ should be mentioned here.

The alloys according to an embodiment of the invention contain one or more of the following metals: Mg, Ti, Si, Ba, Sr, Ca, Be, Zr, Cr, Fe, Sn, Bi, and always aluminum. The friction lining mixtures according to the invention can also contain powder of a metal mixture consisting of the above-mentioned components. The alloys are produced by melting and homogenizing the components so as to form a finely dispersed system. Numerous such alloys are commercially available.

The portion of the alloys according to an embodiment of the invention in the friction lining mixture or in the finished friction lining can preferably be 5% to 30% by weight, especially 10% to 20% by weight. These alloys can be used in all commonly known friction linings. Therefore, there is no need for any special adaptation of the other components of the friction lining to the alloys described here. In the mixtures of the state of the art, for instance, preferably only the zinc component or the zinc alloy component is replaced by the alloys according to the invention. The percentage by weight of the aluminum alloys in the friction lining mixture is a function of the desired aluminum content, taking into consideration any additional aluminum metal (powder) that might be present.

The alloys according to an embodiment of the invention are preferably introduced into the friction lining mixture in powder or particle form. Tin sulfates having a percentage by weight of between about 0.5% to 10% by weight, preferably about 2% to 8% by weight, can be present as the lubricating agent.

When it comes to the production of the friction lining, it is provided for the aluminum alloys that are preferably present in the form of a strand or block to first be liquefied and subsequently vaporized in order to form essentially spherical particles. These particles are then mixed with a conventional friction material mixture or with the components of a conventional friction lining mixture and compressed at known temperatures and pressures in order to form a friction lining.

However, pulverulent particles can also be formed directly out of the melt of the alloy, for instance, by means of vaporization or else by means of centrifugation over the edge of a rotating disk. The particle size of the alloys according to the invention is preferably within the range from 100 μm to 700 μm. Aluminum alloys with other metal such as, for example, Al/Mg alloys, are commercially available in particle form.

Metal oxides, metal silicates and/or metal sulfates, either individually or in combination with other fillers, can be present as fillers for the friction linings according to the invention. The fibrous substances preferably consist of aramide fibers and/or of other organic or inorganic fibers. Aside from the aluminum alloy, for instance, steel wool and/or copper wool can also be present as metals.

Preferably, tin sulfides having a percentage by weight of 0.5% to 10% by weight, preferably 2% to 8% by weight, are employed as lubricants. The tin sulfides can be admixed to the friction lining mixture, for example, in the form of powder.

Fundamentally speaking, the alloys according to embodiments of the invention can be used in any desired friction lining mixture. The friction linings according to the invention can be produced by means of conventional methods known from the state of the art, that is to say, by mixing all of the initial components and compressing the thus-obtained friction lining mixture at an elevated pressure and elevated temperature. In the typical application case, the aluminum alloy in powder form is put into a mixer together with other mixture components, as a result of which the alloy particles are homogenously distributed in the friction material during the mixing procedure. This also means that, when an appertaining brake lining is used, the friction process always causes new material containing aluminum to reach the surface of the friction lining. Consequently, uniform and constant conditions are always present on the surface of the friction lining during is cycle of use.

Sufficiently high friction values, for example, of 0.35 to 0.4, along with low wear and tear to the brake disk or rotor, can be achieved with the friction linings according to the invention in combination with brake disks or rotors containing aluminum.

EXAMPLE

A friction lining mixture according to the invention can have, for instance, the following composition:

| raw materials | % by weight |
|---|---|
| aluminum-Mg/Ti alloy | 10 to 20 (>5% by weight of aluminum) |
| aluminum oxide | 0.5 to 2 |
| mica powder | 5 to 8 |
| baryte | 5 to 30 |
| iron oxide | 5 to 15 |
| tin sulfides | 2 to 8 |
| graphite | 2 to 6 |
| coke powder | 10 to 20 |
| aramide fiber | 1 to 25 |
| resin filler powder | 2 to 6 |
| binder resin | 3 to 7 |

Moreover, aside from aluminum (as metal or in the form of an alloy), mixtures according to the invention can also contain, for example, steel/steel wool, copper and/or copper alloys.

Therefore, the present invention relates to the use of the aluminum alloys according to the invention and of aluminum metal for friction linings to be employed in combination with brake disks and rotors containing aluminum. It also relates to the use of such brake linings for the above-mentioned purpose, and to a brake system that comprises the friction linings or brake linings according to the invention as well as the above-mentioned brake disks or rotors.

The invention claimed is:

1. A motor vehicle brake system comprising:

a brake disk or brake rotor containing 20% to 60% by volume of aluminum, said aluminum in a form of aluminum metal or aluminum alloy, said brake disk or brake rotor having a brake surface comprising aluminum adapted for contacting friction linings; and a friction lining used in conjunction with the brake disk or brake rotor, said friction lining consisting of: (a) from 10% to 20% by weight of aluminum alloy particles, wherein the aluminum alloy has the formula $Al_xZ_y$, wherein Z stands for Mg and/or Ti, and x and y each mean ranges of 10% by weight up to and including 90% by weight, (b) from 2% to 8% by weight tin sulfides, (c) from 1% to 25% by weight aramide fibers, (d) from 0.5% to 2% by weight aluminum oxide, (e) from 3% to 7% by weight binder resin, (f) from 2% to 6% by weight resin filler powder, (g) from 5% to 8% by weight mica powder, (h) from 5% to 30% by weight baryte, (i) from 5% to 15% by weight iron oxide, (j) from 2% to 6% by weight graphite, and (k) from 10% to 20% by weight coke powder.

2. The motor vehicle brake system of claim 1, wherein the aluminum alloy is a binary Al—Mg alloy or an Al—Ti alloy.

3. The motor vehicle brake system of claim 1, wherein the binary aluminum alloy is $AlTi_{10}$ or $AlMg_{50}$.

4. The motor vehicle brake system of claim 1, wherein the aluminum alloy particles have a size ranging from 100 μm to 700 μm.

5. The motor vehicle brake system of claim 1, wherein the brake disk or brake rotor contains at least about 40% by volume of aluminum.

* * * * *